No. 791,316. PATENTED MAY 30, 1905.
S. S. BREESE & C. L. LAURANCE.
RUNNING GEAR.
APPLICATION FILED JULY 12, 1904.
2 SHEETS—SHEET 2.
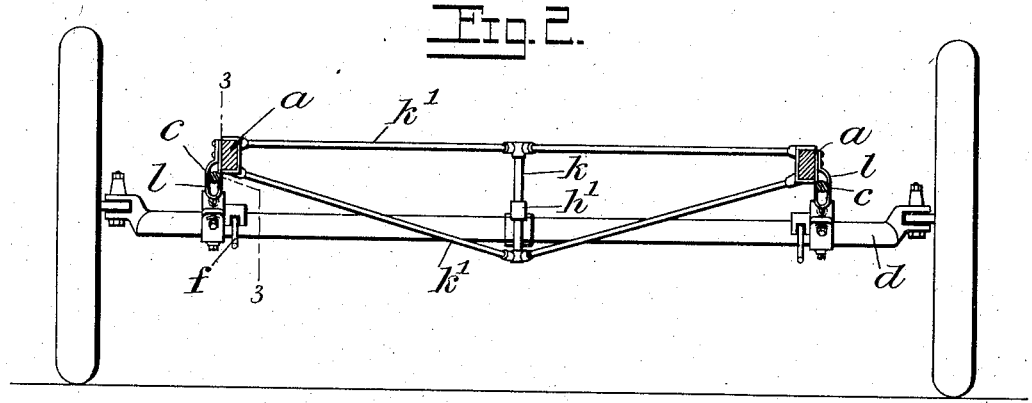
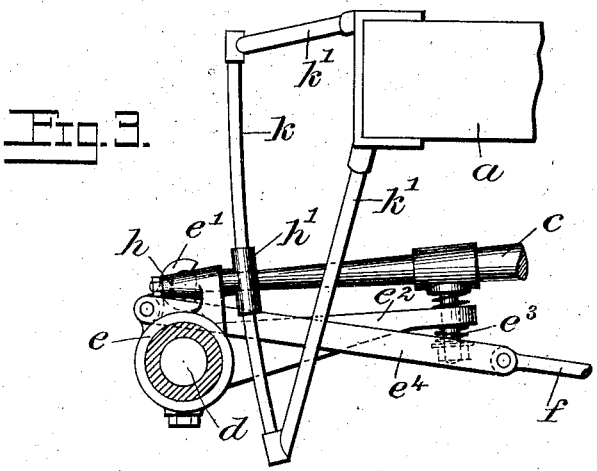
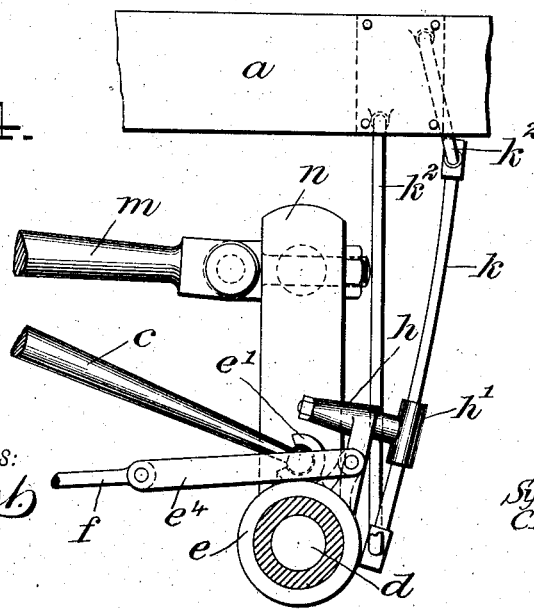
WITNESSES:
INVENTORS
Sydney S. Breese
Charles L. Laurance
BY
ATTORNEYS No. 791,316. Patented May 30, 1905.

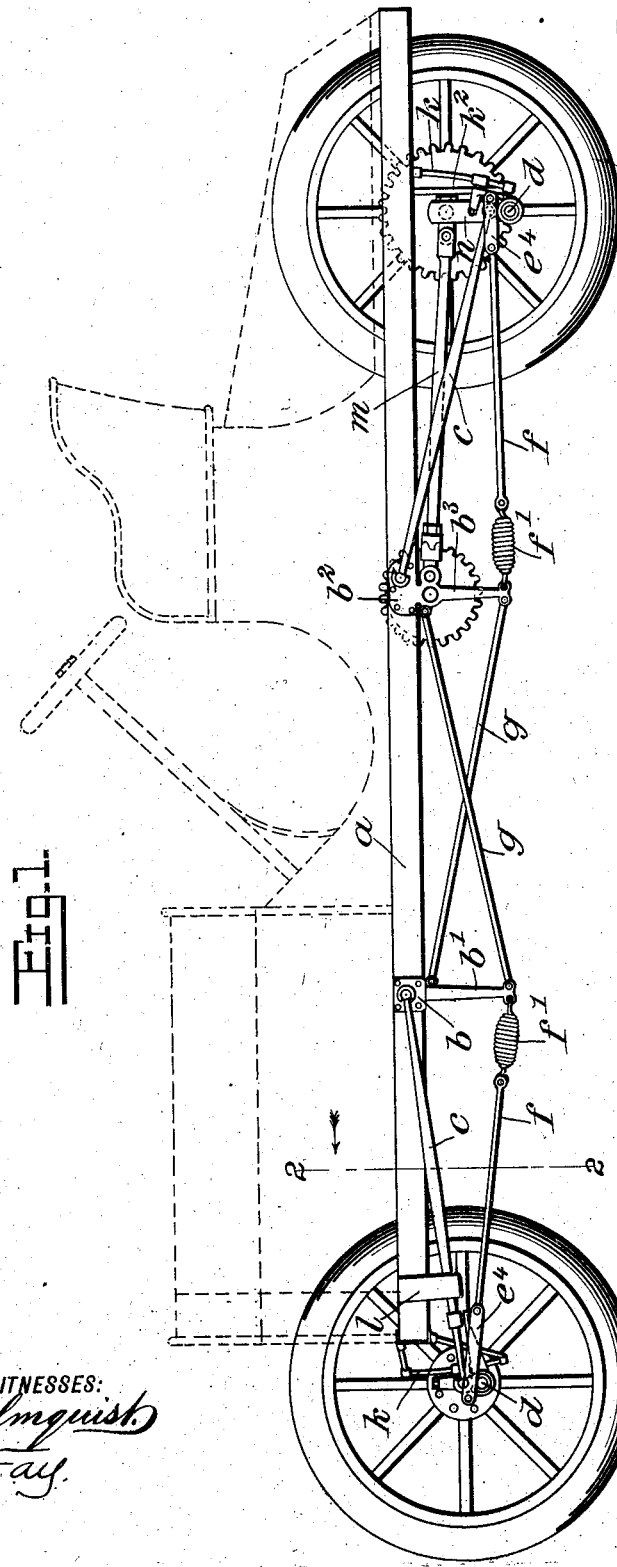

UNITED STATES PATENT OFFICE.

SYDNEY S. BREESE, OF SOUTHAMPTON, AND CHARLES L. LAURANCE, OF BAYSHORE, NEW YORK.

RUNNING-GEAR.

SPECIFICATION forming part of Letters Patent No. 791,316, dated May 30, 1905.

Application filed July 12, 1904. Serial No. 216,203.

*To all whom it may concern:*

Be it known that we, SYDNEY S. BREESE, residing at Southampton, and CHARLES L. LAURANCE, residing at Bayshore, in the county of Suffolk and State of New York, citizens of the United States, have invented a new and Improved Running-Gear, of which the following is a full, clear, and exact description.

Our invention relates to running-gear for vehicles and the like which is especially applicable for automobiles, but is capable of general use.

The objects of the invention are to provide a running-gear of the class mentioned which will be lighter and of greater strength than those now known and also which will be flexible in all directions, but will operate without vertically deflecting the body of the vehicle.

Reference is to be had to the accompanying drawings, forming a part of this specification, in which similar characters of reference indicate corresponding parts in all the figures.

Figure 1 is a side view of the body of a vehicle, showing a preferred form of our invention. Fig. 2 is a sectional view on the line 2 2 of Fig. 1. Fig. 3 is a sectional view on the line 3 3 of Fig. 2, and Fig. 4 is a similar sectional view of the rear part of the running-gear.

In the drawings, $a$ represents the frame of a vehicle, which may be of any character whatever. Upon the frame are brackets $b$ and $b^2$, which support downwardly-projecting struts $b'$ and $b^3$. From the brackets $b$ and $b^2$ extend radius-rods $c$ $c$. These rods are pivotally attached to the brackets and to the front and rear axles $d$ $d$ of the vehicle. Loosely swiveled upon the rear axle, as shown in Fig. 4, and firmly attached to the front axles are frames $e$, which are provided with spherical joints $e'$ for the reception of the ends of the two radius-rods. One or each of these frames $e$ is provided with a projection $e^2$, which is provided with a device $e^3$ to prevent the axle turning over and to allow for deflection from the plane of the radius-rods when one wheel crosses an obstruction. These frames also have projections $e^4$, which may be integral therewith or pivoted to them, as indicated in the drawings, and to which are pivoted tie-rods $f$. The rods $f$ are provided with springs $f'$, and these springs are connected to the struts $b'$ and $b^3$. It will be obvious that the springs may be of any desired character and kind and may be located at any point in the length of the tie-rods without departing from the spirit of our invention. The outer ends of the struts are connected by cross-ties $g$ to the brackets $b$ $b^2$ or to the frame of the vehicle, as indicated in Fig. 1. The elements $b'$, (or $b^3$,) $f$, $f'$, and $g$ taken together constitute the struts and ties of a truss, and it will be apparent that they operate in connection with the radius-rod $c$ to form a flexible and yet firm support for the body of the vehicle and that on account of the location and construction of the various parts the whole device will be very light and strong, and consequently can be applied to vehicles of greater size and weight than many of the devices now in use. It will also be seen that when passing over an obstruction the springs will tend to yield without deflecting the body of the vehicle vertically and that in the construction shown in Fig. 4 the frames $e$ will be free to swing on the axles. Supported also from each of the frames $e$ is a bearing $h$, in which is swiveled a guide $h'$ for a curved guide-rod $k$. One of these guide-rods is placed at each end of the vehicle, and they are secured to the vehicle by means of brackets $k'$ $k'$ and $k^2$ $k^2$ or in any other desired or convenient manner. It will be obvious that the location of these guide-rods is not material, but that they should be located at such points as will be most advantageous.

$l$ is a leather strap for preventing excessive rebound.

$m$ is a chain-tightening device which is pivoted to the bracket $b^2$ and to a projection $n$ from the frame $e$. It will be understood that when the chain-tightening device is used the shape of certain of the parts will have to be correspondingly altered, as shown at the rear axle in Figs. 1 and 4, and these modifications will obviously come within the scope of our invention.

Having thus described our invention, we claim as new and desire to secure by Letters Patent—

1. A running-gear comprising a rod pivotally connected with the frame of a vehicle and with an axle thereof, a strut mounted on the frame, and a yielding connection between the strut and the axle.

2. A running-gear comprising a radius-rod connected with the frame of a vehicle and with an axle thereof, and a yieldable truss connecting the axle and frame.

3. A running-gear comprising a radius-rod pivotally attached to the frame of a vehicle and to an axle thereof, a truss comprising a strut rigidly mounted on the frame, a tie joining the strut with the axle, and a tie joining the strut with the frame.

4. The combination of a vehicle-frame and an axle therefor, with a radius-rod pivotally attached to the frame and to the axle, and a truss comprising a strut mounted on the frame, and ties for the strut, said ties including a yielding member.

5. The combination of a vehicle-frame, and an axle therefor, with a radius-rod pivotally attached to the frame and to the axle, a strut mounted on the frame, a tie-rod connecting the strut with the frame, a tie-rod connecting the axle with the strut, and a spring attached to said last-named tie-rod.

6. A running-gear comprising a rod pivotally connected with the frame of a vehicle and with an axle thereof, a guide-rod, and a guide for said rod mounted on the axle of the vehicle.

7. A running-gear comprising a radius-rod pivotally attached to the frame of a vehicle and to an axle thereof, a curved guide-rod connected to the frame, and a guide for said rod mounted on the axle of the vehicle.

8. A running-gear for vehicles, comprising an axle having an offset portion, and a rod pivotally connected with the frame of the vehicle and with the axle thereof in said offset portion at a point on a straight line between the centers of the wheels attached to said axle.

9. A running-gear comprising a radius-rod pivotally connected with the frame of a vehicle and with an axle thereof at a point on a straight line between the centers of the wheels of the vehicle, and a chain-tightening device connected to said frame.

10. A running-gear, comprising a rod pivotally attached to the frame of the vehicle and to an axle thereof, a strut mounted on the frame, a connection between the strut and the axle, and a chain-tightening device mounted between the strut and the axle for varying the distance between them.

11. The combination of a vehicle-frame, and a pair of axles therefor, with a rod pivotally attached to each axle and to the frame, a pair of struts mounted on the frame, a tie-rod connecting each strut with the frame, a rod connecting each axle with one of the struts, a spring attached to each of the last-mentioned rods, and a chain-tightening device mounted between one of the struts and the axle to which it is connected, for varying the distance between the strut and axle.

In testimony whereof we have signed our names to this specification in the presence of two subscribing witnesses.

SYDNEY S. BREESE.
CHARLES L. LAURANCE.

Witnesses:
MARGARET C. KANE,
ARTHUR B. CALKINS.